June 1, 1954 F. MUCKLER 2,679,841
HOT FOOD TABLE CONSTRUCTION
Filed May 4, 1951 2 Sheets-Sheet 1
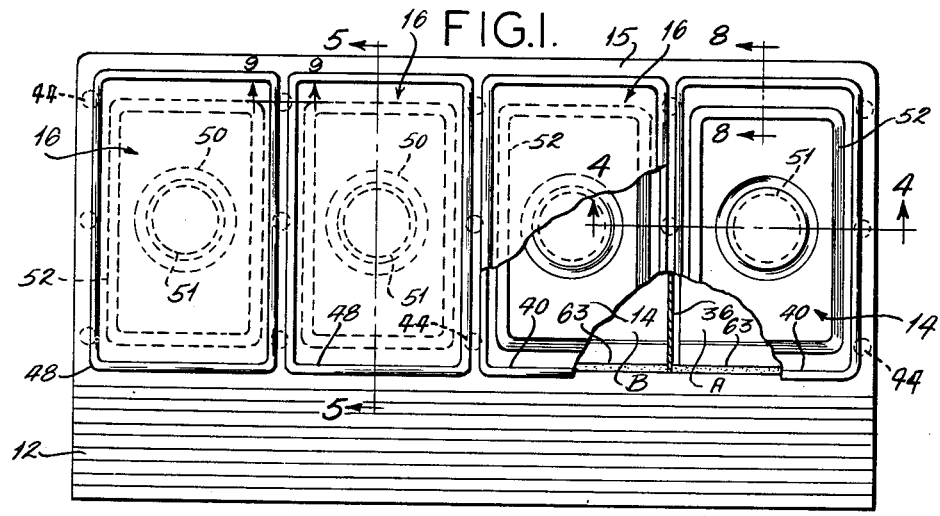
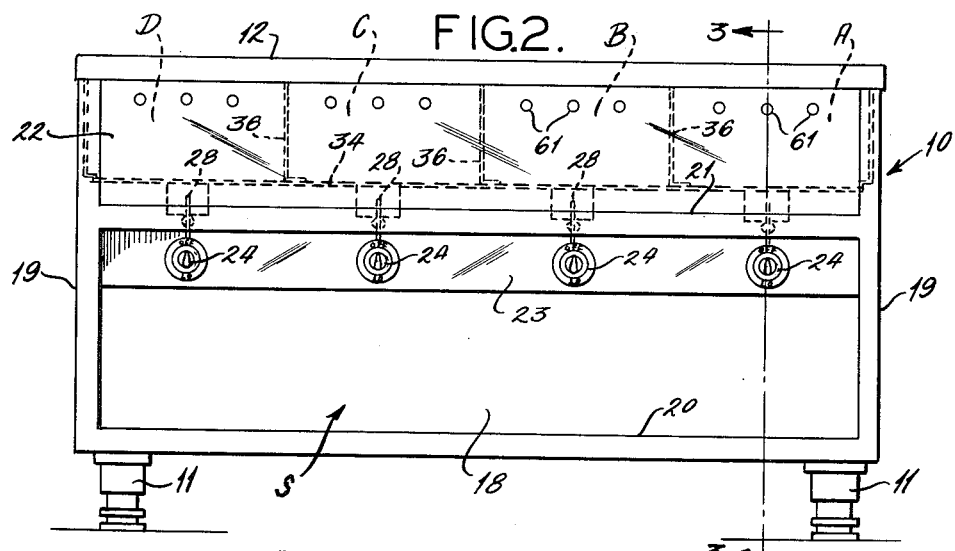
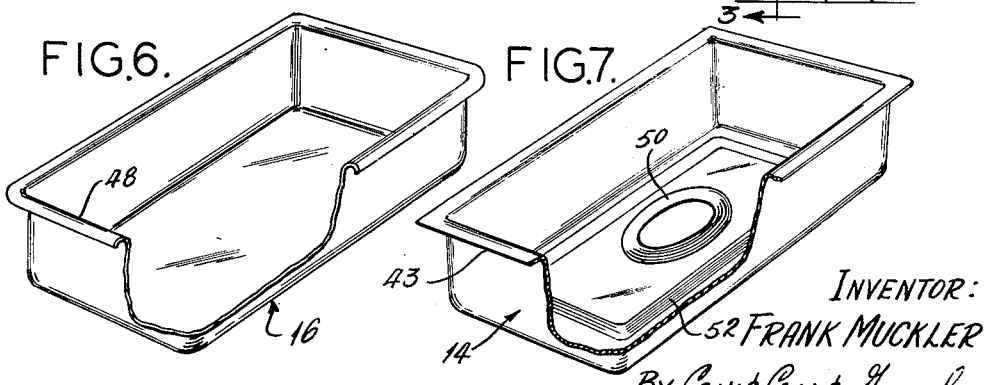
INVENTOR:
FRANK MUCKLER
By Carr & Carr & Gravely
ATTORNEYS.

June 1, 1954　　　F. MUCKLER　　　2,679,841
HOT FOOD TABLE CONSTRUCTION
Filed May 4, 1951　　　　　　　　　　2 Sheets-Sheet 2
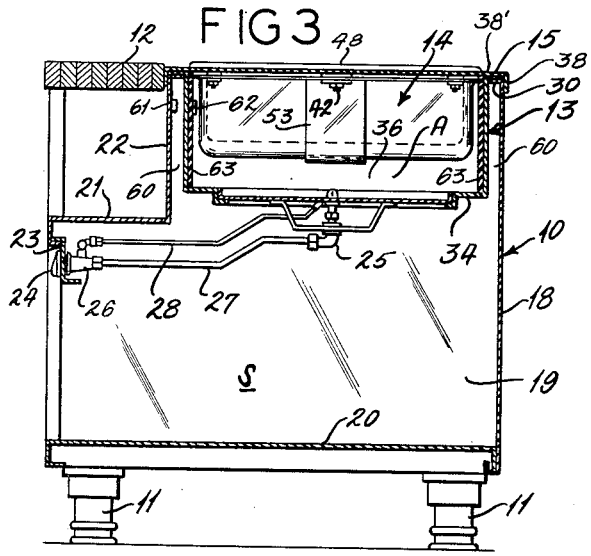
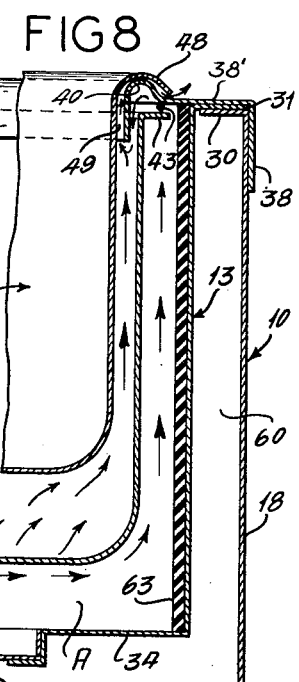
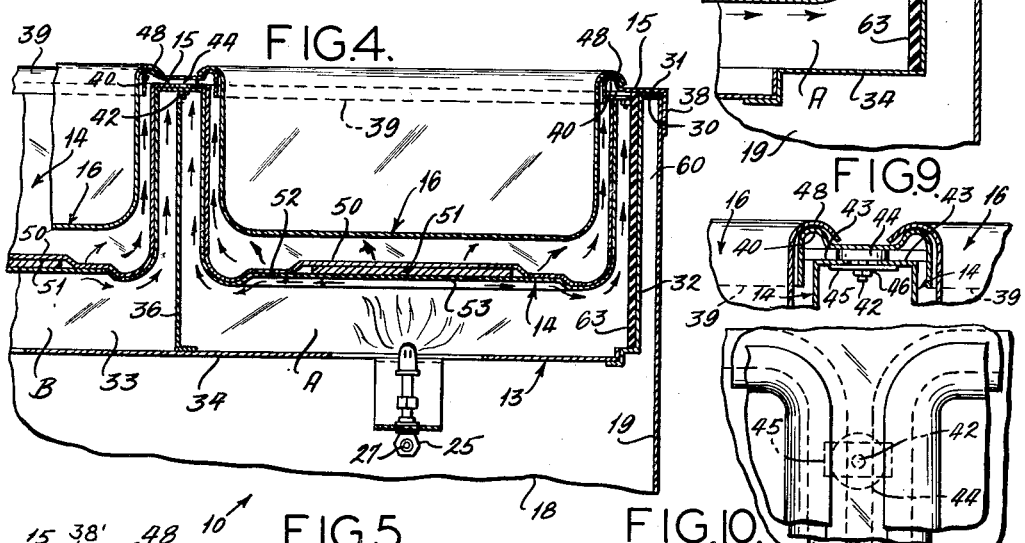
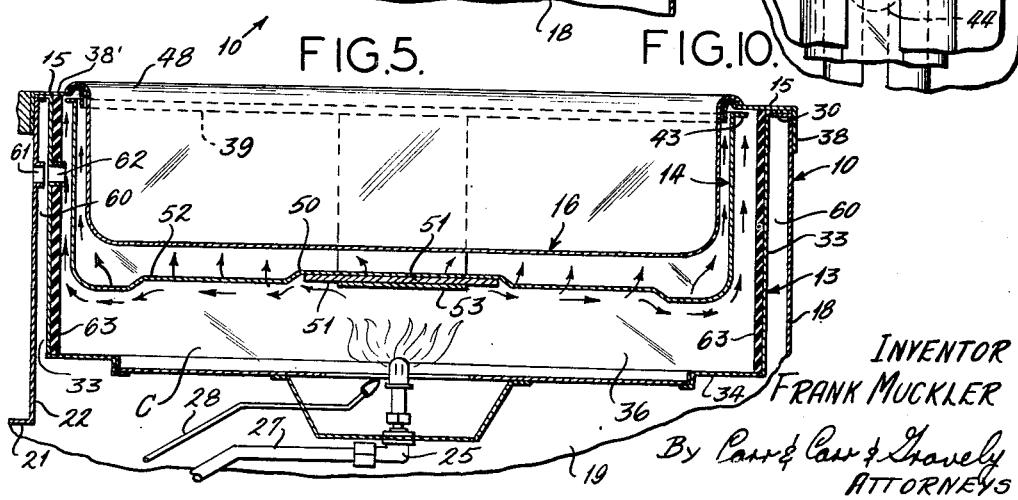
INVENTOR
FRANK MUCKLER
By Carr & Carr & Gravely
ATTORNEYS

UNITED STATES PATENT OFFICE 2,679,841

HOT FOOD TABLE CONSTRUCTION

Frank Muckler, Sappington, Mo., assignor to Southern Equipment Company, St. Louis, Mo., a corporation of Missouri Application May 4, 1951, Serial No. 224,609

11 Claims. (Cl. 126—33)

This invention relates to food storage table units, particularly for hot food storage.

An important object of this invention is to provide a food storage unit which will function to maintain a desired appetizing condition during the hot storage of food, particularly for restaurant applications and in connection with portable food storage units.

It is an object of this invention to provide a food storage unit employing materials which may be shaped by simple processes with relatively inexpensive machines, so that the parts may be easily manufactured and result in a food storage unit which will facilitate cleaning and maintenance of its sanitary condition.

It is an additional object of this invention to provide a food storage unit with a plurality of heating compartments each individually controlled so that the hot or warm storage of different foods may be maintained by the selection of the most favorable conditions of dry or moist heat.

A still further object of the present invention is to provide a food storage unit embodying a series of nested members arranged in spaced relation to form a series of passages which are interconnected for directing the hot convection currents about the food containing member.

A still further object of the present invention is to provide in a hot food storage unit, a heating well for a food containing pan, whereby the heating well may be utilized as a wet well for producing moisture in the form of steam over the food contained in the pan, or as a dry well after evaporation of the water, without danger of burn out of the material of the well.

It is a further object hereof to construct a food storage table with a few simply formed parts which cooperate to provide closed internal spaces forming dead air zones which function to reduce the transmission of heat in those areas of the unit which are most likely to be exposed.

The present invention consists in the combination of a frame structure having one or more internal heating compartments open at the top, a top plate having apertures therein for each of the heating compartments with a marginal lip for each aperture directed into the heating compartment, an open top heating well suspended in each heating compartment with its top margin beneath or adjacent the lip portion of the top aperture so that hot convection currents traveling upwardly about the heating well will be directed by said marginal lip to the heating well, and a food containing pan suspended in each of the heating compartments with its peripheral flange engaging the top adjacent the marginal lip thereof in such manner that the hot exhaust flow, under slight positive pressure in the space between the pan and the heating well, occurs around the peripheral flange of the food pan to form an enveloping layer over the food contained in the pan.

The invention further consists in the construction of a hot food unit having one or more food storage pans individually suspended in a heating well which may contain a quantity of water to permit operation thereof to maintain foods for extended periods without loss of moisture, the tendency of the food to give up moisture being opposed by the escaping vapor around the marginal flange of the food pan which envelops the food therein with a moist heated layer.

The invention further consists in the parts, and the construction and arrangement of the parts which will hereinafter be more specifically described in connection with the accompanying drawings, wherein:

Fig. 1 is a top plan view of a hot food storage unit having a plurality of separate heating compartments therein;

Fig. 2 is a longitudinal elevational view of the hot food storage unit shown in Fig. 1;

Fig. 3 is a transverse sectional elevation of the hot food storage unit seen along line 3—3 of Fig. 2;

Fig. 4 is an enlarged fragmentary longitudinal sectional elevational view of the unit showing certain details of construction thereof, as seen along line 4—4 in Fig. 1;

Fig. 5 is an enlarged fragmentary transverse sectional elevation taken at line 5—5 in Fig. 1;

Fig. 6 is a perspective view of a typical food container or pan, a portion thereof being broken away to illustrate the preferred contour of the peripheral margin thereof;

Fig. 7 is a perspective view of a typical heating well, a portion being shown in broken section for revealing its form or contour;

Fig. 8 is an enlarged fragmentary transverse sectional elevational view taken along the line 8—8 in Fig. 1;

Fig. 9 is a fragmentary longitudinal sectional elevation taken at line 9—9 in Fig. 1; and Fig. 10 is a top plan view of the construction shown in Fig. 9.

The present invention is shown in connection with Figs. 1, 2 and 3, wherein the unit is in the form of a hot food storage table which comprises a frame 10, formed of suitable sheet or strip material, supported by leg elements 11 at its four corners and provided with a carving board 12 along one upper longitudinal side. Adjacent the carving board 12 are located internal frame assemblies 13 providing separate heating compartments A, B, C and D in which individual heating wells 14 are adapted to be suspended. The compartments are covered over by a top plate 15 having apertures registering with each of the compartments and through which food containing pans 16 may be suspended within the heating wells, all as will hereinafter be more particularly described.

The frame 10 of the present food storage table is provided with an exposed front wall 18, opposite end walls 19 and a bottom wall 20 to which are connected the leg elements 11. The frame structure forms an enlarged space above the bottom wall 20 beneath the cutting board 12 to provide a storage area S therein. Above the storage area is located a plate shelf 21 having a back panel 22 and a front depending flange 23, such flange forming a panel on which are mounted suitable control means 24 for the heating heads or burners 25. In the present disclosure, control means 24 comprises a valve unit 26 connected by a gas supply pipe 27 with the burner head 25, there being a similar control 24 for each burner 25 located in the compartments 13. A pilot light supply line 28 is provided to render the ignition of the gaseous fuel automatic upon proper manipulation of the control 24. It is obvious that the heating heads 25 and controls 24 may be substituted by electrical means, or liquid fuel control and burner means, all as will be found desirable to extend the usefulness of the table.

Referring now in detail to Figs. 4 and 5, the frame 10 consists of the front wall 18 and end walls 19 having inturned flanges which form a ledge 30 about the upper periphery thereof. The ledge 30 is adapted to support an outturned flange 31 formed about the upper periphery of the heating compartment frame 13. This latter frame comprises end walls 32, front and rear walls 33, a bottom panel 34 and a plurality of intermediate partitions 36 which divide the heating frame into the individual heating compartments A, B, C and D. It is preferred to construct the heating compartment frame 13 as a unitary subassembly which may be placed in or removed from the frame structure 10, it of course being necessary to first disconnect the heating head 25 and its appertinent control connections.

The unitary top or cover 15 is provided with a downwardly directed peripheral flange 38 (Fig. 8) which is adapted to fit over the exterior wall members of the table frame 10. The top also has an overhanging portion 38' directed inwardly to provide a flat rim area outlining each of the heating compartments. Each of the heating compartments A, B, C and D is located in alignment with a turned or rolled lip portion 39 formed along the overhanging portion 38' in the top 15, the lip portions 39 extending downwardly and inwardly of the upper zone of the heating compartment. Adjacent the lip 39 is a bead 40 which outlines each opening to receive the food pans.

The top plate 15 is provided with a plurality of depending threaded studs 42 (Figs. 3, 9 and 10) which are suitably attached at the under surface of the overhanging portion thereof. The studs provide means for securing the individual heating wells 14 to the top plate 15 so that they enclose the lip 39. In a typical connector assembly of Fig. 9, the heating well is provided with an outturned, substantially flat flange 43 (Fig. 7) which is spaced from the top 15 by an asbestos or other suitable heat insulator washer 44. However, the top marginal flange 43 is behind the lip 39 and beneath the rolled bead 40. A metal clip or washer 45 engages the under surface of the well flange 43 and a nut 46 threaded up on the stud 42 presses the clip plate 45 upwardly against the flange 43, thereby securing the heating well in proper suspended relation to the underside of the overhanging portion of the cover 15. A plurality of these securing studs 42 are distributed on the underside of the plate 15 so that each of the heating well units 14 may be removably attached thereto at a plurality of spaced points. An examination of Fig. 1 will show the disposition of such securing means.

In Fig. 6 a typical food containing pan 16 has been shown, it being particularly important to note that this pan is provided with an upper rolled marginal flange 48 which is adapted (Fig. 8) to engage over the bead or rolled formation 40 of the top plate 15. The curvature of the bead 40 of the top plate is formed on a smaller radius than the rolled marginal flange 48 of the pan 16, thereby creating a difference in fit, together with differences in manufacturing tolerances between the two parts, which results in the formation of a non-continuous small space or separation 49 between the parts 40 and 48 for the passage of the moist or hot currents outwardly of the pan 16 in an enveloping layer as will be noted hereinafter, the separation 14 is intermittently enlarged by the development of pressure under lip 48 which raises it from lip 40.

Referring again to Figs. 4 and 5, the heating well units 14 are each provided in the bottom surface thereof with a centrally located downwardly opening recess 50 of circular configuration to receive a heat plate 51 formed of suitable material, as iron. Adjacent the central recess 50 is an elongated recess 52 which suitably stiffens or strengthens the bottom surface of the heating well 14. The recess 52 further forms a downwardly opening cavity under the heating well 14 to retard the upward flow of the heated currents, thereby first concentrating the heat in the bottom zone of the well, particularly within the mass of the plate 51. Plate 51 is removably retained within the recess 50 by means of a transversely directed strip 53 which is attached at the opposite sides of the heating well beneath the flange 43 thereof.

Heat generated by the burner head 25, due to combustion of the gaseous fuel, can be regulated to supply the desired heat to the compartment A (Fig. 4), and, as has been above pointed out, a large proportion of the heat is concentrated over the bottom surface of the heating well 14 by reason of the mass of the plate 51 and the recess 52. However, heat will follow the arrows along the outer surfaces of the heating well 14 and travel upwardly between the surfaces of the heating well and the walls of the compartment A by convection. The heated currents (Fig. 8) will pass through the space between the flange 43 on the heating well and the lip 39 on the top plate 15, thereby being directed downwardly into the space between the heating well 14 and the exterior of the food containing pan 16. At the same time heat is traveling into the space between the heating well and the food pan, a greater quantity of heat will pass into this same space by radiation through the bottom surface of the heating well 14. In a construction of this character, the confinement of the heat within the several passages will develop a slight positive pressure, measurable in ounces, so that it is advantageous to permit relief of this pressure along the escape passage 49 formed by and between the marginal portion 40 of the top 15 and flange 48 of the food pan 16.

It should now be clearly understood in what manner the present food storage table may be constructed to provide a plurality of interconnected spaces or areas for the control of heat, by radiation as well as convection currents, to obtain a more efficient utilization of the heat provided by the individual burner heads 25. It will also be apparent that the frame structure of the present table comprises an internal compartment frame 13 which is spaced from the external frame 10 by a dead air space 60 which acts to insulate or retard the transmission of heat through the surfaces of the outer frame 10. This has been found to provide an adequate degree of protection for those exterior surfaces of frame 10 which are exposed to contact by persons approaching the food table from the front or ends. For more exacting conditions, the present table may be further heat insulated by the use of a layer of suitable material 63. This layer 63 may be of the reflective type which is characterized by metallic foils which have a polished surface. Aluminum foil is an excellent example of the material which can be used.

In Figs. 2 and 3 it can be seen that one zone of the dead air space 60 is provided with a series of vent ports 61 formed in the back panel 22 of the plate shelf 21 for the escape of excess heat. Spaced inwardly from the vent port 61 are a second series of vents 62 (Fig. 5) formed in the frame wall of the heating compartment 13. Vents 62 are auxiliary to the provision of escape passages 49 under the marginal flange 48 of the food pans 16. The series of vents 61 are located to direct heat on and about dishes which may be stacked on the shelf 21, thereby maintaining such dishes in a warm condition which is greatly desired for the serving of food.

A particularly important feature of the present food storage unit, exemplified by the table in the drawings, is the adaptability thereof for both dry and moist operation, and for high, low or modulated heat input to the food. The placing of a small quantity of water in any of the wells 14 converts that well to moist operation in which the moist currents or vapor escape about the pan flange 48 and flow back and over the food to cover the same with a moist layer which prevents loss of moisture from the food and maintains its attractive appearance. The wells are fully capable of being used without water therein, and such use, whether initial or as a result of evaporation of water, will not cause the bottom of the wells to burn out due to the iron heat plates 51. It is also possible to heat water in the wells very rapidly, since heat is imparted to the water both by radiation and by convection currents. This dual heat flow function has been explained above. The heat control permits keeping different foods at their individual heat conditions which will preserve their appearance and prevent over cooking.

What I claim is:

1. In a hot food table, the combination of a table frame having an internal frame assembly forming heating compartment open at the top, an apertured top for said compartment having a portion overhanging the heating compartment with a marginal lip, an open top heating well connected to the underside of said overhanging portion and positioned in said compartment spaced from said internal frame and suspended with its top margin beneath said overhanging portion and behind said marginal top lip, said top lip being directed into said heating well and acting to direct the heated currents into said well from the space adjacent thereto, and a food pan in said well having a peripheral flange engaging said top adjacent said marginal lip.

2. The combination of claim 1, wherein said heating well has a bottom recess for retarding the flow of heated currents upwardly about said well for increasing radiant heating in said well.

3. The combination of claim 1, wherein said heating well has a bottom recess, and a heat plate is positioned in said recess to concentrate heat therein for radiant heating of said well.

4. The combination of claim 1, wherein said apertured top has a bead formed adjacent said marginal lip, and said flange on said food pan engages about said bead to provide a passage for the outflow of heated currents from said heating well.

5. The combination of claim 4, wherein said bead has a curvature, and said food pan flange has a curvature, one curvature being different from the other to provide said passage.

6. The combination of claim 1, wherein said heating compartment is carried in said table frame, and said table frame includes enclosing walls spaced from said heating compartment to define insulating dead air spaces about said heating compartment.

7. The combination of claim 1, wherein said heating compartment is removably carried in said table frame and said heating well is carried by said top in suspended position within said heating compartment.

8. In a hot food table, the combination of an outer sheet metal frame having an open top defined by an inturned flange, an internal frame having a projecting flange supported on said inturned flange, said internal frame defining a heating compartment spaced from said outer frame, a top cover for said outer frame removably positioned thereon, said top cover having an outer depending flange engaging said outer frame and an inwardly directed rim overhanging said internal frame and terminating in an inner depending lip portion defining the margins of an opening in said top cover, an open well forming member carried by said top cover in spaced relation from said internal frame, said well being spaced from and located behind said depending lip portion of the top cover and said depending lip extending into said open well, and a food pan having an open top with a peripheral flange, said flange on said foot pan engaging adjacent said top cover depending lip portion for support in said well member in spaced relation thereto.

9. In a hot food storage unit the combination of a food container having a flanged margin, a heating well in which said food container is received, a frame structure including a heating compartment open at the top to receive said heating well, said food container, heating well and heating compartment being located in spaced relation, a top for said frame structure having an aperture defined by a lip directed into said heating well between the adjacent walls of said heating well and food container, said food container being supported by its flange on said top adjacent said aperture lip and said heating well being supported by said top at the underside thereof, a heating head in said heating compartment for subjecting said heating well to direct heating, and a heat plate between said heating head and the heating well to concentrate the heat in the adjacent zone of said heating well for radiant heating of said food container, said heating head creating hot convection currents which move upwardly between said heating compartment and heating well and are directed by said lip downwardly into said heating well for circulation about said food container.

10. In a hot food storage unit the combination of a food container having a flanged margin, a heating well to receive said food container, a frame structure including a heating compartment open at the top to receive said heating well, a top on said frame having an aperture registering with said heating compartment and a lip directed downwardly within said aperture, support means on said top for holding said heating well within said heating compartment in spaced relation, said food container flange engaging said top adjacent said lip to support the same within said heating well in spaced relation, said lip being located between the adjacent walls of said food container and heating well for dividing the space therebetween into two passages, one of which is an escape passage leading from said heating well, said heating well containing a heating fluid for immersing the lower portion of said food container, and a heating head in said heating compartment for heating and vaporizing the heating fluid in said heating well by radiation through said heating well and by heated convection currents moving upwardly between said heating well and heating compartment into the other of said two passages for direction by said lip downwardly into said heating well.

11. The combination set forth in claim 10, and also including a heat plate adjacent the bottom of said heating well for concentrating heat in the bottom area of said heating well.

References Cited in the file of this patent

UNITED STATES PATENTS

| Number | Name | Date |
|---|---|---|
| 268,852 | Barlow | Dec. 12, 1882 |
| 388,500 | Parker | Aug. 28, 1888 |
| 410,765 | Mosher | Sept. 10, 1889 |
| 465,425 | Canaday | Dec. 15, 1891 |
| 896,898 | Daniels | Aug. 25, 1908 |
| 987,386 | MacKenzie | Mar. 21, 1911 |
| 1,263,004 | Tollagsen | Apr. 16, 1918 |
| 2,182,682 | Shroyer | Dec. 5, 1939 |
| 2,202,320 | Sacerdote | May 28, 1940 |
| 2,234,596 | Heilman | Mar. 11, 1941 |
| 2,288,795 | Earl | July 7, 1942 |
| 2,563,253 | Levin | Aug. 7, 1951 |

FOREIGN PATENTS

| Number | Country | Date |
|---|---|---|
| 614,684 | Germany | June 14, 1935 |